United States Patent [19]
Mohler

[11] 3,816,047
[45] June 11, 1974

[54] INTERLOCK ACTUATING MEANS FOR MOLD ASSEMBLY

[75] Inventor: Forrest N. Mohler, Indianapolis, Ind.

[73] Assignee: E-W Mold & Tool Co., Inc., Indianapolis, Ind.

[22] Filed: July 18, 1972

[21] Appl. No.: 272,767

[52] U.S. Cl................ 425/249, 425/438, 425/468
[51] Int. Cl.............................. B29c 1/06, B29f 1/02
[58] Field of Search ........... 425/468, 249, 414, 438, 425/441, 443; 249/142, 176, 177; 74/29, 30, 50, 55

[56] References Cited
UNITED STATES PATENTS

| | | | |
|---|---|---|---|
| 1,167,238 | 1/1916 | Williams | 74/30 |
| 1,918,532 | 7/1933 | Geyer | 425/251 |
| 3,060,509 | 10/1962 | McCubbins, Jr. | 425/450 |
| 3,199,358 | 8/1965 | Bradlee | 74/55 X |
| 3,473,197 | 10/1969 | Wilds et al. | 425/249 |
| 3,509,603 | 5/1970 | Halsall et al. | 425/249 |

*Primary Examiner*—J. Spencer Overholser
*Assistant Examiner*—Robert J. Craig
*Attorney, Agent, or Firm*—Woodard, Weikart, Emhardt & Naughton

[57] ABSTRACT

In a mold assembly in which cantilever mounted cores are held tightly in compression at their free ends during a portion of the molding cycle by reciprocable wedge members which engage the cores at their ends and lock them against displacement, a rotating crank element for actuating the wedge members for movement in unison which does not require holding of close dimensional tolerances on associated parts of the mold and which permits actuation of added banks of wedge members for larger molds.

1 Claim, 5 Drawing Figures

3,816,047

INTERLOCK ACTUATING MEANS FOR MOLD ASSEMBLY

BACKGROUND OF THE INVENTION

In the injection molding of articles such as thin-walled, multi-partitioned containers (for example, automotive storage battery cases with multiple cell partitions), the mold assemblies utilize relatively lengthy, cantilever mounted cores which extend into a cavity member. Although the cores are mounted rigidly at their base and are customarily fabricated of steel, because of thermal stresses and momentary unbalanced application of hydrostatic forces by the liquid molding material, the cores invariably tend to shift or be displaced slightly and, in the molding of articles such as electrical storage battery cases, this results in uneven cell wall thickness and an unsatisfactory product. Merely bracing the free ends of the cores results, inherently, in apertures appearing in the molded part at the area of contact between the braces and the cores. Further, analysis of the problem has shown that a satisfactory solution to the problem requires bracing of the complete core array in two transverse planes so as to place the entire array of cores under compression, rather than a mere holding of the core ends.

In Wilds et al. U.S. Pat. No. 3,473,197, assigned to the assignee of the present invention, there is disclosed a means for bracing the cores by placing reciprocable wedge members at the free ends of the cores in the mold assembly which extend slightly between the cores to provide a wedging action. The wedge members are withdrawn out of contact with the cores as the molding cycle proceeds to prevent the formation of openings at the areas of engagement of the cores and the reciprocable wedge members.

The concept of the present invention provides an improved means for providing the required reciprocating motion of the wedge members which minimizes sideward force components acting on the mold elements and which can readily accommodate and move multiple banks or series of wedge members.

BRIEF DESCRIPTIN OF THE DRAWINGS

BRIEF DESCRIPTION OF THE PREFERRED EMBODIMENT

The mold assembly herein described is of the injection molding type in which the two halves of mold assembly are fastened in place to the stationary and movable die plates or press platens of a conventional injection molding machine (not shown).

Figure 1:
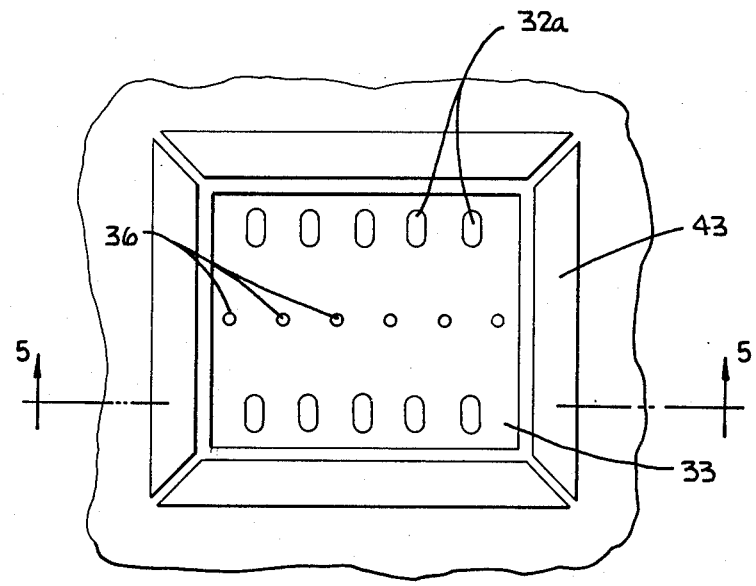
FIG. 1 is a fragmentary front view of the cavity member portion of a mold assembly of a type providing environment for the present invention.
Figure 4:
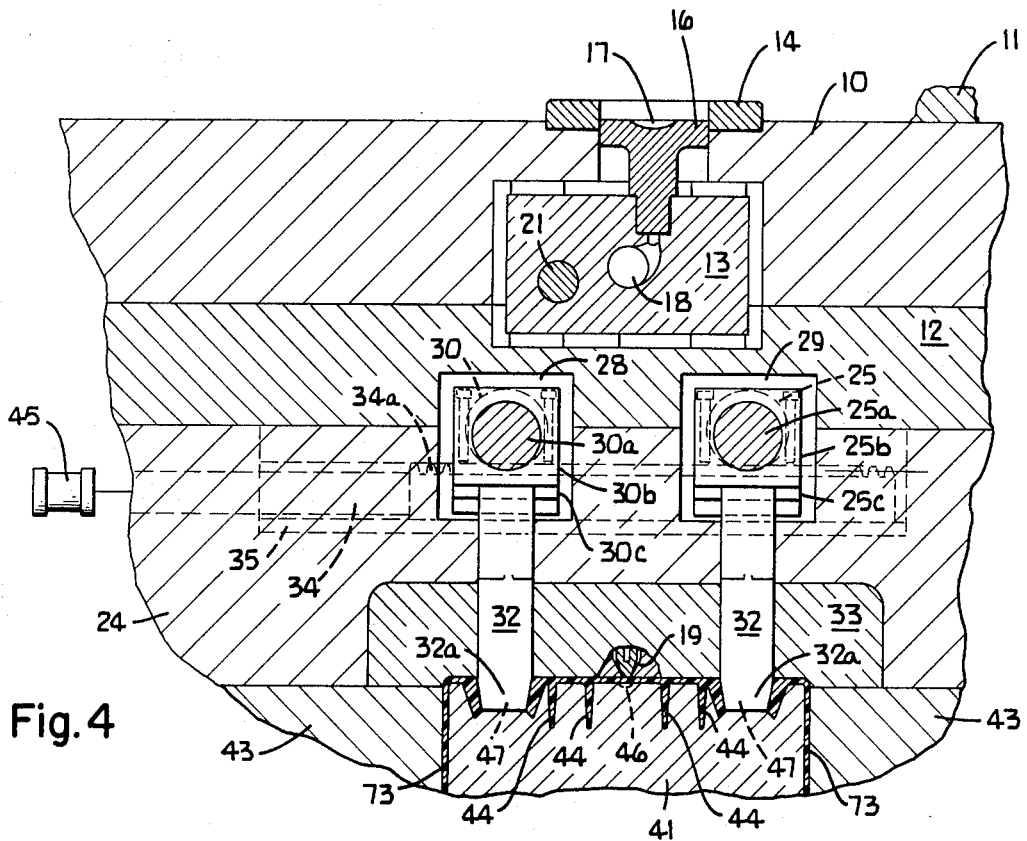
FIG. 4 is a sectional view of the mold assembly of the present invention taken generally along the line 4—4 of FIG. 2 but showing the array of cores inserted in the cavity.

Referring initially to FIGS. 1 and 4, the cavity member portion of the mold includes the cavity clamping plate 10 (FIG. 4) which, when in place in an injection molding press, is engaged by the press platen, indicated fragmentarily at 11. Underlying the clamping plate 10 is the cavity back-up block 12. The block 12 and plate 10 jointly accommodate the hot runner bar 13 which, as may be seen in FIG. 4, is rectangular in cross section. A counterbored aperture in the plate 10 accommodates the locating ring 14 and the sprue bushing 16. The sprue bushing 16 is provided with an indentation 17 into which the press nozzle seats. A central passage through the sprue bushing 16 serves to transmit hot molding material from the injection nozzle into an elongaged passage 18 which acts as a runner for a series of secondary sprues, one of which is shown in FIG. 4 and identified at 19. The runner bar 13 may be provided as is conventional, with a heater extending through the bar and identified at 21.

The cavity back-up block 12 and a cavity retainer block 24, adjacent the block 12, are formed to jointly provide elongated, parallel slots or ways 28 and 29 (FIG. 4). As may best be seen in FIG. 5, rigid with the slot 28 are bearings 27 which journal a crankshaft 30. The crankshaft has alternate portions 30a of its length offset from its rotational axis and these offset portions each carry a block 30b formed of two registering halves joined by screws as will be evident from FIG. 4. Although only crankshaft 30 is visible in FIG. 5, as FIG. 4 indicates, a crankshaft 25, identical to shaft 30, extends through and is journalled for rotation in the slot 29. The shaft 25 has offset portions 25a which carry blocks 25b, identical to blocks 30b. The blocks 30b and 25b are free to move angularly about the shaft portions 30a and 25b on which they are supported and each block is formed along its lower margin to provide a depending, T-shaped portion identified at 30c and 25c, respectively.

The T-shaped portions are accommodated in correspondingly shaped slots in the heads 32a of two aligned rows of wedge members 32, the two rows of wedge members being located on opposite sides of the row of secondary sprues 19, as will be evident from FIG. 4. As the shaft 30 is rotated, the wedge members 32 will be moved vertically, in unison, between their solid line position of FIG. 5 and their upper or raised position, indicated by broken line 31 of FIG. 5.

Rotation of shaft 30 is accomplished by means of a rack 34 which extends in an appropriately formed way 35 in the block 24. The rack has a toothed portion 34a which meshes with gears 39 one of which is carried by each of the shafts 30 and 25. As may best be seen in FIG. 4, the rack 34 may be rectilinearly moved by any suitable means such as the hydraulic cylinder indicated schematically at 45.

The wedge members 32 extend freely through apertures in the cavity retainer block 24 and through apertures in the bottom cavity insert 33. The bottom cavity insert 33 also carries an aligned row of apertures forming the secondary sprues 19, previously mentioned, which receive molding material from the runner 18. While only one of the secondary sprues is visible in FIG. 4 the slight convex formation and the apertures in which the sprues terminate can be seen in FIG. 1, the terminating apertures for the sprues being there identified at 36.

When the mold assembly is completed, the cavity structure, in general, so far described, receives an array of parallel cores 41. As here illustrated the cores 41 (FIG. 2) are six in number and are mounted, cantilever fashion at their base, in the core retainer plate, not shown. When the mold is assembled, the cores 41 extend into the opening bounded by the cavity side cams 43 (FIG. 4) and into spaced, but close proximity to the cavity insert 33. In assemblying the mold, it will be understood that the protruding core array shown in FIG. 2 fits within the opening bounded by the cavity side cams 43 of FIG. 1 to provide the structure shown in FIGS. 4 and 5. The end surfaces of the cores are provided with aligned, transverse slots 44 which extend to a depth indicated in FIG. 4 to provide reinforcing ribs at the base of the molded article. The slight concavity centrally within each of the cores, and identified at 46 in FIGS. 2 and 5, accommodates the adjacent convex surface of the secondary sprue area, and it will be understood that when the cores are in assembled relation with respect to the bottom cavity insert 33, the concavities 46 will register with the convex surfaces 36 of the insert 33 (FIG. 1).

Figure 2:
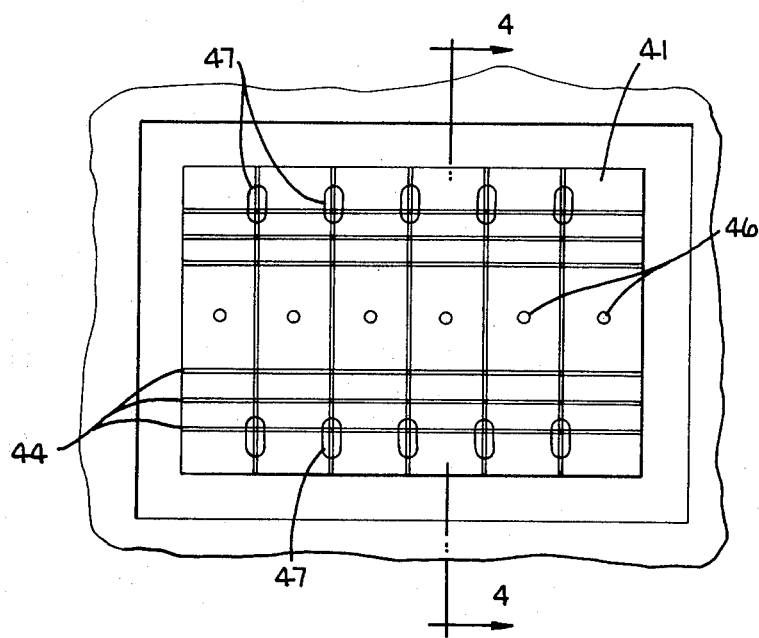
FIG. 2 is a view of a core array, adapted to fit within the cavity member of FIG. 1, together with a portion of the core retainer plate.
Figure 5:
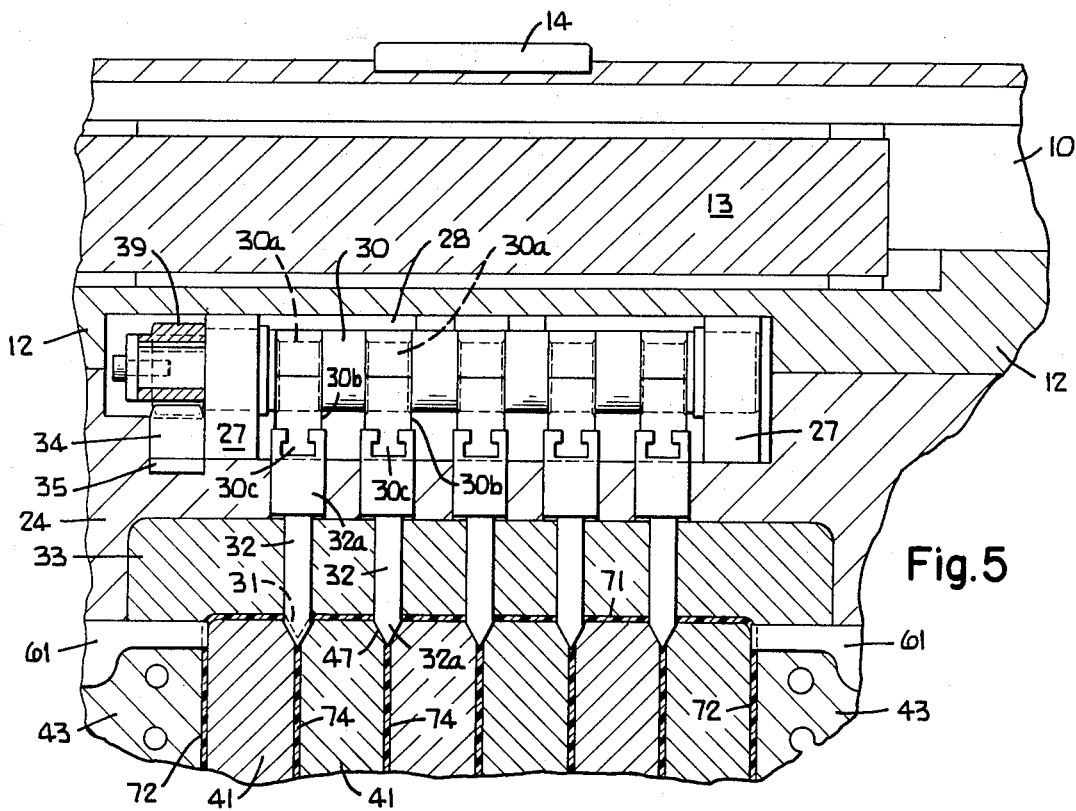
FIG. 5 is a sectional view of the mold assembly of the present invention taken generally along the line 5—5 of FIG. 1 but showing the array of cores inserted in the cavity.

As may best be seen in FIGS. 2 and 5, adjacent end areas of each of the cores are undercut to provide generally wedge or V-shaped slots 47, the slots being visible in cross section in FIG. 5. It will be noted that the wedge shaped openings thus provided extend along the adjacent surfaces of adjoining cores. These slots are adapted to accommodate the wedge or V-shaped ends 32a of the wedge members 32. In FIG. 4, the wedge members 32 are shown in their extended position, that is, their position in which they extend into the apertures 47 and tightly engage the cores. When the rack 34 is moved rightwardly as viewed in FIG. 4, the resulting rotary motion imparted to the shafts 25a and 30a withdraws the end portions 32a of the wedge members from the cores and into the positions illustrated by broken line 31 in FIG. 4. A stripper plate (not shown) extends into proximity with the cores and engages the cavity side cams 43 when the mold is closed. The stripper plate performs its conventional function in the stripper plate ejection conventionally used where thin-wall sections are present in the molded part, the stripper plate moving when the mold has been opened after the molding process to remove the molded article from the cores as is conventional.

Referring to FIG. 5, means are provided to produce the sideward forces on the outer cores in the core array to lock the outer cores firmly in compression. This means includes the side locking members 61, one on each end of the array of cores. These side locking members are rigidly secured, at their outer ends, to the thrust pin of an actuating element which may take the form of the hydraulic cylinder (not shown). Actuation of the member 61 moves them horizontally, as viewed in FIG. 5, from an extended position in which the ends of the locking members are in engagement with the outer side surfaces of the outer cores to a position in which they are withdrawn slightly from engagement with the core surface as indicated by broken lines in FIG. 5.

Figure 3:
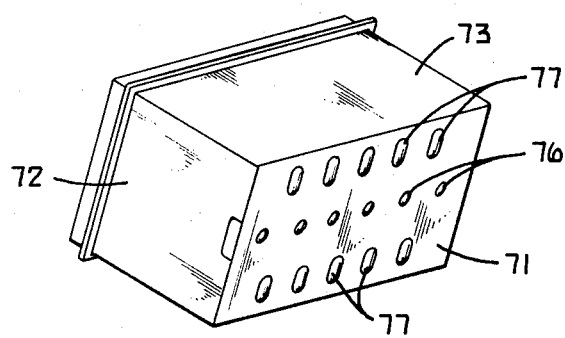
FIG. 3 is a perspective view, taken from the base, of a typical battery case molded in the mold assembly of the present invention.

At the start of the molding operation the wedge members 32 and the side locking members 61 are in their solid line positions of FIG. 5 tightly locking the ends of the cores 41. Typically, a polyolefin molding material such as polypropylene is injected, by the molding machine, through the secondary sprues and the apertures 36 into the space between the cores and the cavity. The hot liquid molding material flows into the spaces between the cores and around the outer core surfaces to assume the shape of the battery case illustrated in FIGS. 3 and 4. Study of the mechanics of the flow of the liquid molding material indicates that its rate of flow at various parts of the core-cavity interspace is quite irregular and is a "stuttering" type of flow thus producing the unbalanced, hydrostatic forces on the cores which, under prior art practice, cause them to deflect and result in uneven molded article wall thickness. The engagement of the core ends by the side locking members 61 and by the wedge members 32 tightly locks the cores in compression against such deflection.

As the molding cycle proceeds, the liquid molding material fills the interspace between the cores and cavity providing the base 71, ends 72, sides 73 (FIG. 4) and partitions 74 in the molded container. As the molding cycle proceeds, the wedge members 32 and the side locking members 61 are moved by their respective actuating means into their broken line positions of FIG. 5, in which they are spaced from the core surfaces by an amount corresponding to the desired local wall thickness for the molded container. As the members 32 and 61 are withdrawn, molding material flows around them and closes the space at the core surfaces previously occupied by the withdrawn members. After molding is completed the mold assembly is opened by operation of the molding machinery and the molded container is ejected from the mold in conventional fashion. The secondary sprues leave a row of slight concavities 76 in the base of the molded container and rows of wedge-shaped indentations 77 also appear in the base of the container identifying the area of entry of the wedge members 32, these being shown in FIG. 3.

The crankshaft means for providing the required reciprocating, rectilinear motion of the wedge members, at certain points in the molding cycle, results in a minimum of lateral forces on the mold components. While molding of a battery case requiring two banks or rows of wedge members, and therefore two shafts, has been described, it will be apparent that for larger molded articles, requiring more than two rows of wedge members, additional crankshafts and attached wedge members could be provided with the shafts all being rotated by motion of a single rack actuated by a single hydraulic cylinder.

I claim:

1. In a mold assembly in which cantilever mounted cores are held tightly in compression at their free ends during a portion of the molding cycle by reciprocable wedge members which engage the cores and are arranged in separate banks, an improved means for moving the wedge members into and out of engagement with said cores comprising a plurality of crankshafts supported for rotation on axes normal to the direction of motion of said wedge members, segments of each of said crankshafts being offset from the axis of rotation of the respective crankshaft, each of said offset segments journalling a wedge-attaching member for angular motion, a detachable connection between each of said attaching members and a wedge member comprising a generally T-shaped projection and an accommodating T-shaped slot receiving said projection carried by said attaching and wedge members, the wedge-attaching members of any one crankshaft being attached to a single bank of said wedge members, and an actuating means for rotating said crankshafts, said actuating means including a pinion gear carried on each of said crankshafts, a toothed rack supported for rectilinear motion meshing with said gears and a hydraulic power element for moving said rack, whereby rotation of each of said crankshafts provides reciprocating motion, in unison, of the wedge members in its respective bank.

* * * * *